(12) United States Patent
Huynh et al.

(10) Patent No.: US 6,983,366 B1
(45) Date of Patent: Jan. 3, 2006

(54) PACKET PROCESSOR

(75) Inventors: Dung Le Huynh, Aliso Viejo, CA (US); Roger J. Brouwer, Los Angeles, CA (US)

(73) Assignee: Safenet, Inc., Belcamp, MD (US)

( * ) Notice: Subject to any disclaimer, the term of this patent is extended or adjusted under 35 U.S.C. 154(b) by 0 days.

(21) Appl. No.: 09/503,282

(22) Filed: Feb. 14, 2000

(51) Int. Cl.
H04L 9/00 (2006.01)
(52) U.S. Cl. ................................ 713/168; 713/189
(58) Field of Classification Search ..............................
713/153–156, 159–160, 168–170, 200–201, 713/189, 194; 705/65, 67; 370/394, 395.1, 370/395.32
See application file for complete search history.

(56) References Cited

U.S. PATENT DOCUMENTS

| | | | | |
|---|---|---|---|---|
| 5,631,960 A | * | 5/1997 | Likens et al. | 380/2 |
| 5,774,551 A | * | 6/1998 | Wu et al. | 713/155 |
| 5,778,071 A | * | 7/1998 | Caputo et al. | 713/159 |
| 5,911,077 A | * | 6/1999 | Anderson | 710/268 |
| 5,923,756 A | * | 7/1999 | Shambroom | 713/156 |
| 5,987,126 A | * | 11/1999 | Okuyama et al. | 380/203 |
| 5,995,626 A | * | 11/1999 | Nishioka et al. | 705/76 |
| 6,061,449 A | * | 5/2000 | Candelore et al. | 380/28 |
| 6,201,871 B1 | * | 3/2001 | Bostley et al. | 380/249 |
| 6,243,774 B1 | * | 6/2001 | Eide et al. | 710/302 |
| 6,304,658 B1 | * | 10/2001 | Kocher et al. | 380/30 |

OTHER PUBLICATIONS

PCT International Search Report as issue in International Application Number PCT/US01/04599, mailing date: May 4, 2001.

* cited by examiner

*Primary Examiner*—Hosuk Song
(74) *Attorney, Agent, or Firm*—James R. Burdett; Edward W. Yee

(57) ABSTRACT

A method, apparatus, and article of manufacture for a computer implemented packet processor. The packet processor processes packets in parallel. In particular, the packet processor performs a combination of encryption and authentication on data packets. The encryption and authentication processing of a second data packet may begin before the encryption and authorization processes of a first data packet have completed.

40 Claims, 6 Drawing Sheets

PACKET PROCESSOR

BACKGROUND OF THE INVENTION

1. Field of the Invention

This invention relates in general to computer-implemented systems for processing packets, and, in particular, to performing encryption and authentication in parallel while processing packets.

2. Description of Related Art

In the last decade, the use of computers in both the home and office have become widespread. These computers provide a high level of functionality to many people.

Additionally, the computers are typically connected to other computers via a network, such as the Internet and the World Wide Web (also known as "WWW" or the "Web"). Therefore, users are transmitting computer data between computers with increasing frequency. However, the growing use of computers to transmit data has resulted in extensive unauthorized use and copying of data while the data is stored on the computer or being transmitted between computers, costing owners of the data substantial revenue.

Moreover, with the fast growing popularity of the Internet and the World Wide Web (also known as "WWW" or the "Web"), there is also a fast growing demand for improved security of data. One technique for protecting data is by encrypting the data prior to transmitting the data. Cryptography involves transforming data into an unreadable format that can be deciphered with a "key" and transformed into a readable format. Cryptography may be used to protect various types of information, such as e-mail messages and personal information (e.g., bank account numbers). Another technique for protecting data is authentication. Authentication involves determining whether the source of particular data is a valid source. Authentication may involve using passwords or user names. This information may be appended to the data being transmitted so that the receiving computer can authenticate the data as coming from an appropriate transmitting computer.

Various forms of cryptographic units or modules have been developed for providing encryption and/or decryption functions. In addition, various forms of authentication units or modules have been developed for providing authentication functions. A combination of cryptographic and authentication units may be used, for example, to append authentication information to data before or after encryption. This authenticated and encrypted data may then be transmitted from a first computer to a second computer. The second computer uses the authentication information to determine whether the source of the data is a valid source, and also decrypts the data for processing.

If encryption and authentication are implemented in a single unit; then one packet must be encrypted and authenticated before the next packet is encrypted and authenticated. This continues until each packet is processed. One problem with this technique is that each packet to be encrypted must wait until the previous packet was both encrypted and authenticated.

On the other hand, if encryption and authentication are implemented in separate, independent design units, then the second packet need only wait until the required individual resource (rather than the combined encryption/authentication unit) becomes available. For instance, the second packet need only wait until the first packet has been encrypted and passed to the authentication unit. Once the first packet is passed to the authentication unit, the second packet may be provided to the encryption unit and encryption of the second packet may begin while authentication of the first packet proceeds. Thus, the system need not wait until the first packet is completely encrypted and authenticated before beginning encryption of the second package. However, the use of independent encryption and authentication units can result in significantly more communication traffic and congestion on the internal or external communication buses, as data is transferred between memory and each of the independent units. Such congestion can increase processing latency and reduce throughput. The congestion problem increases as the number of authentication units and encryption units increases.

There is a need in the art for more efficient processing of packets to provide security in data storage and transmission.

SUMMARY OF THE INVENTION

To overcome the limitations in the prior art described above, to improve throughput and to overcome other limitations that will become apparent upon reading and understanding the present specification, the present invention discloses a method, apparatus, and article of manufacture for a computer-implemented packet processor.

In accordance with one embodiment of the present invention, a packet processor comprises one encryption unit and two authentication units arranged and controlled such that a packet may be encrypted and authenticated (once or twice) in a single pass through the packet processor. In preferred embodiments, the packet processor is controlled to begin processing a second packet as soon as the required encryption or authentication unit becomes available, while other units may still be processing the first packet. When only one authentication is required, performance is improved even more by using the two authentication units to perform one authentication (for HMAC-key hashing).

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Packet Processor

One embodiment of the present invention provides a packet processor for processing packets of data. In particular, the packet processor encrypts data and/or decrypts encrypted data and provides at least one, and preferably multiple levels of authentication. In preferred embodiments, encryption (or decryption) and authentication are implemented in separate units, such that one or more resources (encryption, decryption or authentication units) may become available to process a data packet, while one or more other resources are processing another data packet. As a result, the system need not wait until the first packet is completely processed, for example, completely encrypted and authenticated, before beginning processing, for example, encrypting, the second package. In further preferred embodiments, a data bus configuration is employed for minimizing communication traffic congestion problems, as data is transferred to and from the separate encryption, decryption and authentication units.

Figure 3:
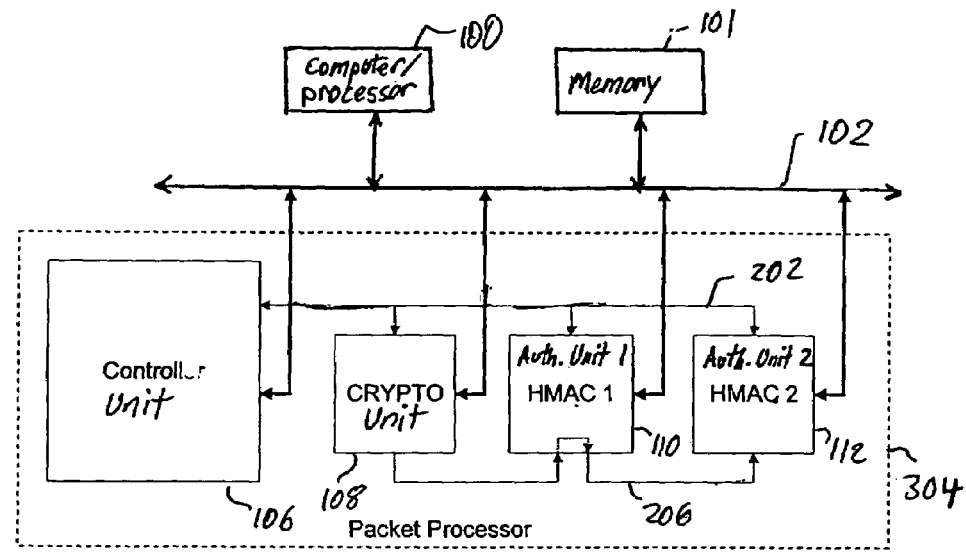
FIG. 3 is an exemplary packet processor and system according to a preferred embodiment of the invention.

In accordance with one embodiment of the present invention, as shown in FIG. 3, a packet processor 204 comprises a control unit 106, one crypto unit 108 and two authentication units 110 and 112, arranged and controlled such that a packet may be encrypted and authenticated (once or twice) in a single pass through the packet processor. However, other embodiments may employ any suitable number of authentication units and crypto (encryption and/or decryption) units. In a preferred embodiment, the control unit 106 comprises a RAM-based controller. However, the control unit may be implemented using any suitable programmable processor or other the like.

The cryptography component 108 may comprise, for example, a "crypto core" having a data encryption standard (DES), which is a symmetric-key encryption technique. With a symmetric-key technique, the sender and receiver of a message share a single key. Alternatively, the cryptography component 108 may use other encryption standards, including, but not limited to, 3DES and RC4. Further embodiments may employ other suitable cryptographic devices and encryption standards, for encrypting and/or decrypting data. The authentication units 110 and 112 may comprise any suitable authentication devices, including, but not limited to "HMAC cores" (e.g., HMAC-SHA-1 or HMAC-MD5), which use standard authentication hashing techniques.

Figure 1:
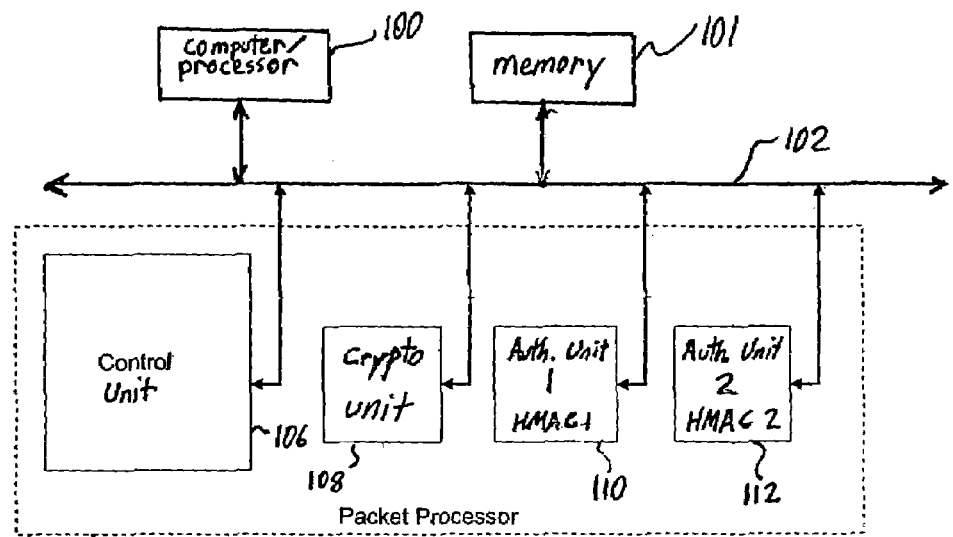
FIG. 1 is an exemplary packet processor and system according to an embodiment of the invention.

In the system shown in FIG. 1, the packet processor 104 is coupled to a computer or main processor 100, through a processor bus 102. The computer or main processor 100 may comprise any suitable computer or data processing device, including, but not limited to a personal computer PC, PowerPC (PPC), mainframe, or the like, which may include, inter alia, a processor device and random access memory (RAM), and may be coupled to one or more data storage devices (e.g., hard, floppy, and/or CD-ROM disk drives, etc.), data communications devices (e.g., modems, network interfaces, etc.), a monitor (e.g., CRT, LCD display, etc.), a mouse pointing device, and/or a keyboard. An example memory device 101 is shown in FIG. 1, coupled to the processor bus 102. The computer 100 may be connected to other devices such as read only memory (ROM), a video card, bus interface, printers, etc., through the processor bus 102. Those skilled in the art will recognize that any combination of the above components, or other components, peripherals, and devices, may be used with the computer 100.

In the FIG. 1 embodiment, the controller 106 and the crypto and authentication units 108, 110, and 112 are each coupled to the processor bus 102 by a respective link and are each capable of being a bus master, to take over the processor bus 102 and perform its own read or write transfers. These devices may also act as slave devices and may be accessed by the computer 100, through the processor bus 102. Because the crypto unit 108 and the authentication units 110 and 112 each use a separate bus interface or link to the processor bus 102, each of those units may be used independently of the other units and may be independently activated to become part of the packet processor. Thus, the packet processor of FIG. 1 may be configured to provide a single cryptographic function (encryption and/or decryption), by activating only the crypto unit 108. Alternatively, the packet processor of FIG. 1 may be configured to provide a single cryptographic function and a single authentication function, by activating the crypto unit 108 and one of the authentication units, such as unit 110. In addition, the packet processor of FIG. 1 may be configured to provide a cryptographic function and two authentication functions, by activating the crypto unit 108 and both of the authentication units 110 and 112. One skilled in the art will recognize that other variations of the FIG. 1 embodiment may employ other combinations of one or more cryptographic units and one or more authentication units, each of which are coupled to a processor bus for read or write transfer operations independent of the other cryptographic or authentication units.

In the embodiment shown in FIG. 1, information to be processed by the packet processor 104 is provided to each of the units 106, 108, 110 and/or 112 over the bus 102, as described below. FIG. 1 may represent an embodiment example, wherein information is provided in the form of one or more packets, for encryption and appending of one or more authorization codes. In such an embodiment, the processor 100 reads packets of information from the processor bus 102 and operates to process the packets to identify data fields to be encrypted. Information to be encrypted is stored in a memory device, such as memory 101, for example, under the control of the processor 100. If the crypto unit 108 is available (not presently encrypting information from another packet), the information to be encrypted is read into the crypto unit 108, over the processor bus 102, from the memory device, such as memory 101. The crypto unit 108 operates to encrypt the information and write the information into a memory device, such as memory 101, over the processor bus 102. Thereafter, the crypto unit 108 is available to encrypt information from another packet. Thus, the crypto unit 108 may begin processing the information from a second packet, without the need to wait for the encrypted information from the first packet to be processed by the authentication units 110 and 112.

The encrypted information written into the memory device is read into a first one of the authentication units 110, which appends an authentication code to the information and writes the information and appended authentication code into a memory device, such as memory 101. Thereafter, the authentication unit 110 is available to authenticate information from another packet. Thus, the authentication unit 110 may begin processing the information from a second packet, without the need to wait for the information from the first packet to be processed by the authentication unit 112.

The encrypted information and appended authentication code may be read into the second authentication unit 112 over the processor bus 102, from a memory device, such as memory 101. The second authentication unit 112 appends a second authentication code to the information and writes the resulting information and authentication codes into a memory device, such as memory 101, over the processor bus 102. The processor 100 may then access the stored information and authentication codes and form a resulting packet composed of encrypted information and two levels of authentication codes. The resulting packet may then be communicated from the processor 100, over the processor bus 102 to a load, user, host or the like, or may be stored in a memory device, such as memory 101, for later use.

The packet processor shown in FIG. 1 may also represent a decryption embodiment example, wherein information is provided in the form of one or more packets, for decryption and verification of authentication codes. In such an embodiment, the processor 100 reads packets of information from the processor bus 102 and operates to process the packets to identify data fields to be authenticated and decrypted. Information to be authenticated is stored in a memory device, such as memory 101, for example, under the control of the processor 100. If the authentication unit 112 is available (not presently verifying the authenticity of information from another packet), the information to be authenticated is read into the authentication unit 112, over the processor bus 102, from the memory device, such as memory 101. The authentication unit 112 operates to verify the authenticity of the information in accordance with well known authentication techniques, to provide first authenticated information. The first authenticated information is communicated over the processor bus 102 and stored in a memory device, such as memory 101. Thereafter, the authentication unit 112 is available to authenticate information from another packet.

The information to be authenticated is also read from the memory device into the authentication unit 110, which verifies the authenticity of the information in accordance with well known authentication techniques, to provide second authenticated information. The second authenticated information is communicated over the processor bus 102 and stored in a memory device, such as memory 101. Thereafter, the authentication unit 110 is available to authenticate information from another packet.

The information in the packet to be decrypted may be read into the crypto unit 108 over the processor bus 102, from a memory device, such as memory 101. The crypto unit 108 decrypts the cipher text from the packet and writes the resulting decrypted information into a memory device, such as memory 101, over the processor bus 102. The processor 100 may then access the stored information and may then communicate the decrypted, authenticated, packet information from the processor 100, over the processor bus 102, to a load, user, host or the like, or may store the information in a further memory device for later use. For inbound packets, other processing orders may be implemented, since there is no data-dependency in the data to be processed by each unit.

While each of the above variations of the FIG. 1 embodiment involve either encryption and appending authentication codes or decryption and authentication verification, in further preferred embodiments, the crypto unit 108 is capable of providing both encryption and decryption functions and is controlled by the processor 100 to provide one of those two functions for a given packet. Similarly, each authentication unit 110 and 112 is capable of providing both authentication code appending and authentication verification functions and is controlled by the processor 100 to provide one of those two functions for a given packet.

Because each of the processing units (crytpo unit 108 and the two authentication units 110 and 112) are individually coupled to the processor bus 102 by a respective link and are each capable of being a bus master, to take over the processor bus 102 and perform read or write transfers, the processor 110 can be controlled to process information from multiple packets at the same time. For example, once the crypto unit 108 completes an encryption process on information from a first packet and writes encrypted data into a memory device, such as memory 101, for further processing by the other processing units, the crypto unit is free to read in and encrypt information from a second packet. While the crypto unit 108 operates on the second packet information, the authentication unit 110 and/or 112 may be operating on the information from the first packet. Another advantage of the illustrated architecture is that authentication processing may be expedited, even when only one authentication is required. More particularly, the secret key authentication algorithm, for example HMAC, may be split into two processes, including an inner hashing and an outer hashing process. The inner hashing is processed in the first authentication unit 110, the result of which is passed to the second authentication unit 112 to perform the outer hash. This frees the first authentication unit 110 to begin processing the next packet.

Thus, the architecture shown in FIG. 1, wherein each processing unit is individually coupled to the processor bus 102 for read and write operations, allows the packet processor to process multiple packets simultaneously and allows processing of the next packet to begin as the resources (such as the crypto unit 108 in the above example) become available, rather than requiring the cryptographic and authentication processing of the first packet to be completed before beginning the processing of a second packet. However, the independent coupling each processing unit 108, 110 and 112 to the processor bus 102 and the multiple read and write operations that are required over the processor bus to process a packet, can result in a relatively large number of communications over the processor bus and, thus, a high level of communication traffic. Also, while embodiments described above employ the processor 100 to control the processing units and the access and storage of information in memory 101, in further embodiments, the processor 106 may be programmed to perform some or all of the functions performed by processor 100 noted above.

Figure 2:
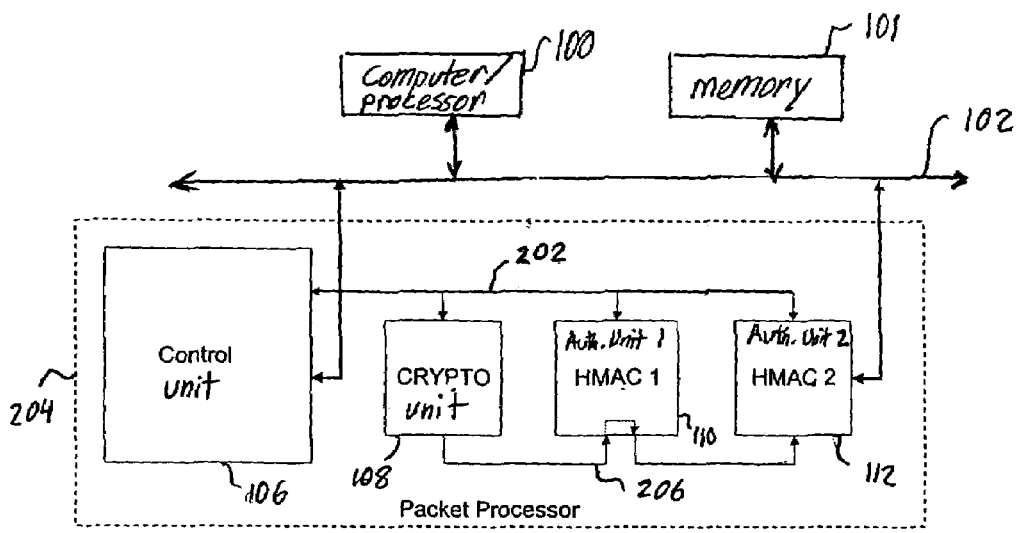
FIG. 2 is an exemplary packet processor and system according to another embodiment of the invention.

A packet processor 204 according to a further embodiment of the present invention is shown in FIG. 2 and is configured to address the above-discussed communication traffic problem. The illustration in FIG. 2 shows a processor 100, memory device 101, and processor bus 102, similar to the corresponding devices described above with respect to FIG. 1. The packet processor 204 in FIG. 2 includes a control unit 106, a crypto unit 108 and two authentication units 110 and 112, similar to correspondingly numbered elements discussed above with respect to FIG. 1. As with the embodiment of FIG. 1, further versions of the packet processor 204 may include any suitable combination of one or more crypto units and one or more authentication units. However, unlike the embodiment of FIG. 1, the packet processor shown in FIG. 2 includes a local bus 202. The control unit 106, the crypto unit 108 and the two authentication units 110 and 112 are each coupled to the local bus 202, with the control unit 106 being the only master on the local bus 202. In addition, the controller and at least the last (and, preferably, all) processing unit(s) in the chain are each coupled to the processor bus 102, with the control unit 106 capable of performing reading and writing operations on the bus 102. The crypto unit 108, authentication unit 110 and authentication unit 112 are coupled for communication in a daisy-chain arrangement, as represented by the daisy-chain connection 206.

Thus, in the FIG. 2 embodiment, only the control unit 106 is coupled to the processor bus 102 for both read and write operations. The processing units in the chain (the crypto unit 108 and the authentication units 110 and 112) are each coupled to receive control instructions and/or data from the control unit 106, over the local bus 202, as discussed below.

The control unit 106 uses its busmaster interface to read in the processing parameters and input packet data. The control unit 106 passes processing parameters to the crypto unit 108, the authentication unit 110 and/or the authentication unit 112, over the local bus 202. Depending upon whether the packet is inbound or outbound and the type of processing required, the control unit 106 passes the input packet information on to the crypto unit 108, the authentication unit 110 and/or the authentication unit 112, over the local bus 202, in the appropriate order. For outbound packets, where the input payload is plain text, the cipher text output from the crypto unit 108 is transferred to the authentication units 110 and 112 for authentication via the daisy chain bus. Additionally, the authentication value provided by the authentication unit 110 is made available to the authentication unit 112 for security packets requiring two authentications. Thus, with the FIG. 2 architecture, the input packet may be read once into the packet processor 204, and up to three cryptographic operations may be performed on the packet. The resulting output packet is written out to the destination, over the processor bus 102, by the processing units (108, 110 and 112), as output data is generated.

In accordance with a preferred embodiment, upon receiving a command from the processor 100 to process a packet, the control unit 106 reads in the commands (instructions) and parameters from the memory device 101 over the processor bus 102 and communicates information to the units that are required to process the packet (units 108, 110 and 112) over the local bus 202. In this manner, the authentication units are set up and ready to accept and process data as it arrives. In further preferred embodiments, the authentication units are capable of buffering instructions, parameters and data for the next packet, while processing an earlier packet.

More specifically, in a system in which one encryption and two authentications are performed on each packet as illustrated, the control unit 106 reads in packet data and passes data to the applicable unit, as follows. For outbound packets, the control unit 106 passes packet data to crypto unit 108, over the local bus 202. The crypto unit 108 encrypts the data and writes out the encrypted data to the memory device 101. The crypto unit 108 may also pass encrypted data to the authentication units 110 and 112 over the daisy chain connection 206. Authentication unit 110 processes the data and writes out authentication code to the memory device 101. Authentication unit 110 may also pass the authentication code to authentication unit 112 to be processed. Authentication unit 112 processes the data and writes out an authentication code to the memory device 101.

For inbound packets, the control unit 106 passes packet data to crypto unit 108, authentication unit 110 and authentication unit 112, over the local bus 202. The crypto unit 108 decrypts the data and writes decrypted data out to the memory device 101. Authentication unit 110 verifies the authentication code and sets a status bit based on the verification results. Authentication unit 112 verifies a further authentication code and sets a status bit based on the verification results. The control unit 106 collects the authentication verification status bits and writes status information to the memory device 101, over the processor bus 102.

Similar to the embodiment shown in FIG. 1, the bus architecture of FIG. 2 allows the ability to process multiple packets simultaneously and to use resources (for example, crypto and authentication units) as such resources become available, rather than waiting until each packet is fully processed before starting the processing of the next packet. However, the use of the local bus 202 and daisy chain bus 206 allows the control unit 106 and processing units 108, 110 and 112 in FIG. 2 to pass information therebetween, without using the processor bus 102. Thus, because the crypto unit 108 and the authentication units 110 and 112 do not use the processor bus 102 for reading input data and because intermediate data is not passed between those units over the bus 102, traffic on the processor bus 102 can be reduced or minimized. In addition, because the processing units are coupled to the processor bus 102 only for communication of the fully processed packet information, the communication traffic demand is minimized, relative to the FIG. 1 embodiment.

In yet further versions of the FIG. 2 embodiment, the fully processed packet information may be communicated from the second authentication unit 112 to the control unit 106, which then communicates the processed packet information over the processor bus 102. In such further versions, the connection between the second authentication unit and the processor bus 102 may be omitted.

Similar to the FIG. 1 embodiment, another advantage of the illustrated architecture in FIG. 2 is that authentication processing may be expedited, even when only one authentication is required. More particularly, the secret key authentication algorithm, for example HMAC, may be split into two processes, including an inner hashing and an outer hashing process. The inner hashing is processed in the first authentication unit 110, the result of which is passed to the second authentication unit 112, for example, over the daisy chain bus 206, to perform the outer hash. This frees the first authentication unit 110 to begin processing the next packet.

A packet processor 304 according to a preferred embodiment of the present invention is shown in FIG. 3 and includes aspects of both of the embodiments discussed above and shown in FIGS. 1 and 2. The packet processor 304 in FIG. 3 includes a control unit 106, a crypto unit 108 and two authentication units 110 and 112, similar to the packet processor shown in FIGS. 1 and 2. As with the embodiments of FIGS. 1 and 2, further versions of the packet processor 304 may include any suitable combination of one or more crypto units and one or more authentication units.

The packet processor 304 in FIG. 3 includes individual connections between each of the processing units (crypto unit 108, authentication units 110 and 112) and the processor bus 102, similar to the embodiment shown in FIG. 1, and a local bus 202 and daisy chain connection 206, similar to the embodiment shown in FIG. 2. Thus, the embodiment of FIG. 3 may operate in accordance with the above-discussed operation of the packet processor 104 in FIG. 1 or the operation of the packet processor 204 in FIG. 2.

Figure 4:
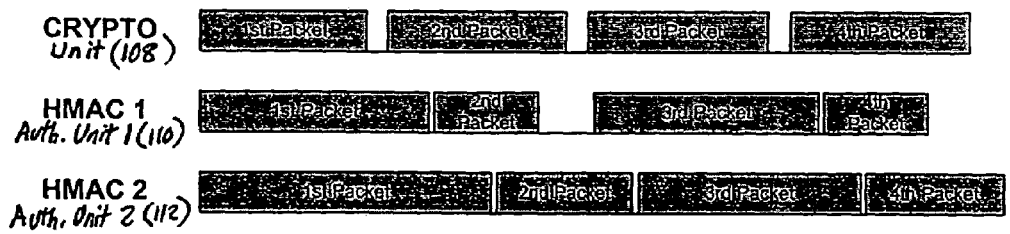
FIG. 4 is a timing chart, illustrating the timing of the processing of multiple packets.

The bus architecture described above allows for improved throughput and reduced traffic over the shared processor bus 102. When multiple cryptographic processing is required, data is passed from one unit to another in a somewhat pipelined manner. This implies that one unit may become available before the other units become available. Depending upon the cryptographic processing requirement of the arriving packets, the packet processor (104, 204 or 304) may start processing the next packet as soon as the required resources become available. FIG. 4 shows an example timing schedule for processing four packets, back-to-back, where all packets require the use of all three processing units. The first and third packets are outbound, while the second and fourth packets are inbound. For outbound packets, the authentication units 110 and 112 receive the cipher text from the crypto unit 108 and, thus, finish processing the packet after the crypto unit 108 has completed its operation. On the other hand, inbound packets already contain cipher text and, thus, the authentication units do not need to wait for data from the crypto unit 108. The second, third and fourth packets are started as soon as the crypto unit 106 finishes processing the previous packet.

Figure 5:
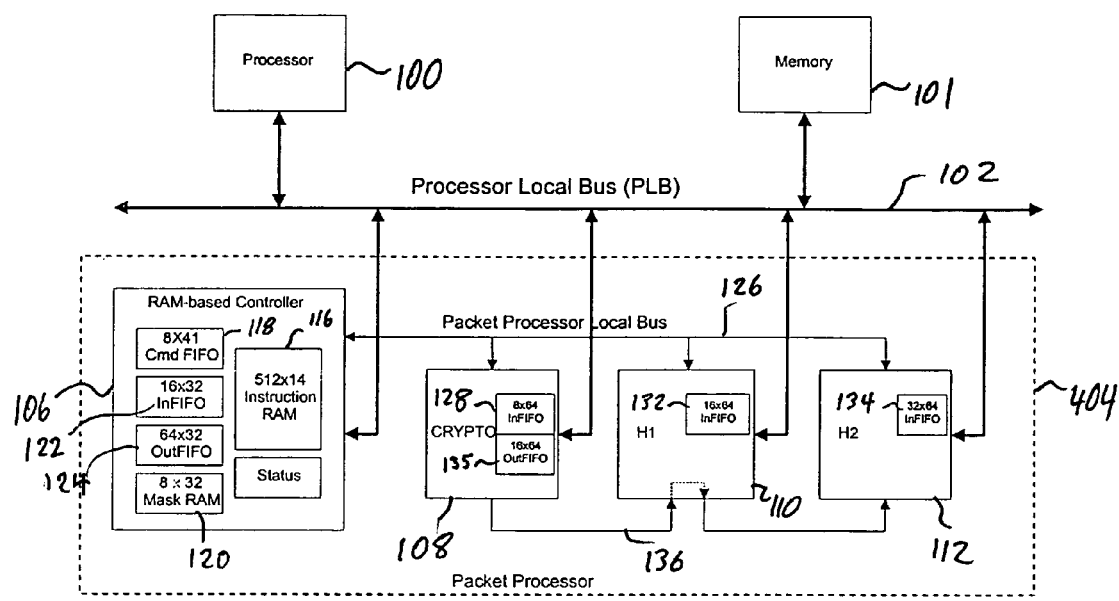
FIG. 5 is a preferred example configuration of the packet processor and system of FIG. 3.

One example configuration and operation of the packet processor and system of FIG. 3 is shown and described with respect to the packet processor 404 and system of FIG. 5. Another example configuration is shown and described in the Appendix attached hereto, which is incorporated herein by reference.

With reference to FIG. 5, the control unit 106 passes parameters from the packet control structures to the cryptography 108 and authentication 110 and 112 components via the packet processor local bus 126. The packet control structures indicate the particular techniques and parameters to be used to encrypt and authenticate a packet. The cryptography component 108 encrypts data received in a First-In-First-Out input queue (InFIFO) 128 and passes encrypted data to the authentication components 112 and 114 and to the First-In-First-Out output queue (OutFIFO) 130, to be written out to a destination such as the memory 101, over the bus 102. That is, the cryptography component 108 passes data to the InFIFO queue 132 of authentication component 110 and to the InFIFO queue 134 of the authentication component 112 via the daisy chain bus 136. In this manner the authentication components 110 and 112 receive the encrypted data for authentication. For a packet that is encrypted and authenticated for transmittal, the status unit 114 contains status information about whether the encryption and authentication processes completed successfully. For a received packet that is decrypted, the status unit 114 reports the status of the authentication value comparison along with the status of whether the decryption and authentication were processed successfully.

Those skilled in the art will recognize that the exemplary environment illustrated in FIG. 5 or in the Appendix is not intended to limit the invention. Indeed, those skilled in the art will recognize that other alternative hardware environments may be used without departing from the scope of the invention.

Typically, the data is sent in packets, which are units of data transmitted over a packet-switching network. Internet Protocol (IP) specifies the format of packets. IP security refers to a set of protocols being developed by the Internet Engineering Task Force, which is a standards organization for the Internet. The IP security protocols support transport encryption mode, in which only the data portion of each packet is encrypted, and tunnel encryption mode, which encrypts both the header and the data portion of each packet.

The packet processor 404 supports the Encapsulating Security Payload ESP and Authentication Header AH protocols as specified for IP security. Specifically, the following transformations are supported for AH protocols:

SHA-1-96
MD5-96
HMAC-SHA-1-96
HMAC-MD5-96

These are standard check sum functions using standard hashing techniques. For authentication, the packet processor 404 could use any of these techniques or some combination of them. For example, the H1 core 110 may use HMAC-SHA-1, while the H2 core 112 may use HMAC-MD5.

The following transformations are supported for ESP protocols:

DES-CBC
DES-CBC with HMAC-SHA-1-96
DES-CBC with HMAC-MD5-96
3DES-CBC
3DES-CBC with HMAC-SHA-1-96
3DES-CBC with HMAC-MD5-96

The packet processor 404 will also support RC4, SHA-1, HMAC-SHA-1, MD5, and HMAC-MD5 standards.

The RAM-based control unit 106 has a small instruction set and a number of dedicated registers. Each instruction performs an operation or a group of operations. These instructions are used to form service routines to process data according to the desired protocol. The general purpose processor 100, such as a PowerPC (PPC), writes these routines to the Instruction RAM 116 via the processor local bus 102 slave interface of the control unit 106.

For each packet to be processed, a control structure is required to describe the packet (such as offsets and sizes), to pass parameters, and specify the cryptographic function to be performed. This can be done by the processor 100 or a host computer. The location of the packet control structure, packet data, and packet processing results are required for each packet to be processed. The Cmd FIFO (i.e., command "First in first out" queue) 118 provides a queue for storing pointers to control structures. For the packet processor 404, all data are aligned on a 32-bit word boundary.

Writing to a command register in the control unit 106 starts the packet processor 404. The packet processor 404 processes commands from the command FIFO 118 according to the mode selected in the command register. For each packet, the packet processor 404 retrieves the instruction RAM 116 offset and packet control structure location from the command FIFO 118 and starts executing the instructions beginning from the specified offset.

Data is first transferred into the control unit InFIFO 122 via the processor local bus 102 master read interface of the control unit 106. Data is processed as it becomes available in the InFIFO 122. The OutFIFO 124 is used to queue data that is to be copied to the destination memory 101, such as IP headers.

The Mask RAM 120 is preferably programmed with a mask pattern for masking out mutable fields in the header of the packet. The Mask RAM in the illustrated embodiment is 8 bits deep and 32 bits wide. Each bit is used to mask out one byte of data, and is applied to data beginning from the first byte in the packet. Thus, with the 8×32 Mask RAM, the first 256 bytes of the packet data may be masked out. The Mask RAM stores mask data for packet data that is in big endian format. If the packet data is in little endian format, then the control unit 106 swaps the bits.

Figure 6:
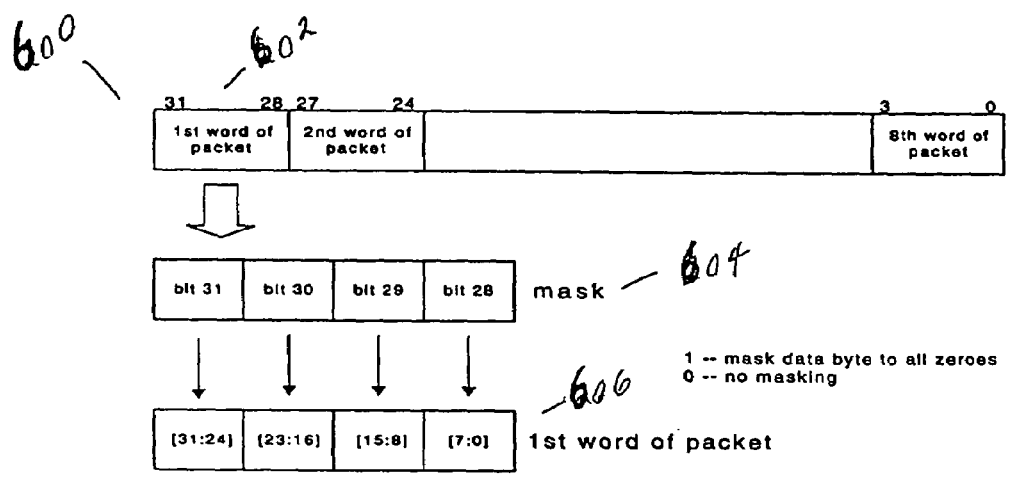
FIG. 6 is a block diagram illustrating a packet and a mask.

FIG. 6 illustrates the format of the first 32-bit word 602 of the mask pattern. The leftmost nibble (bits 31–28) is to be applied to the first 32-bit word of the packet data, while the next nibble (bits 27–24) is to be applied to the next 32-bit word of the packet data, and so on. FIG. 6 also shows the mapping of the four bits of the leftmost nibble 604 to the first four bytes of the packet data. A mask bit of "1" indicates that the data byte is to be masked to all zeroes. A mask bit of "0" indicates that the data byte is not to be masked.

Figure 7:
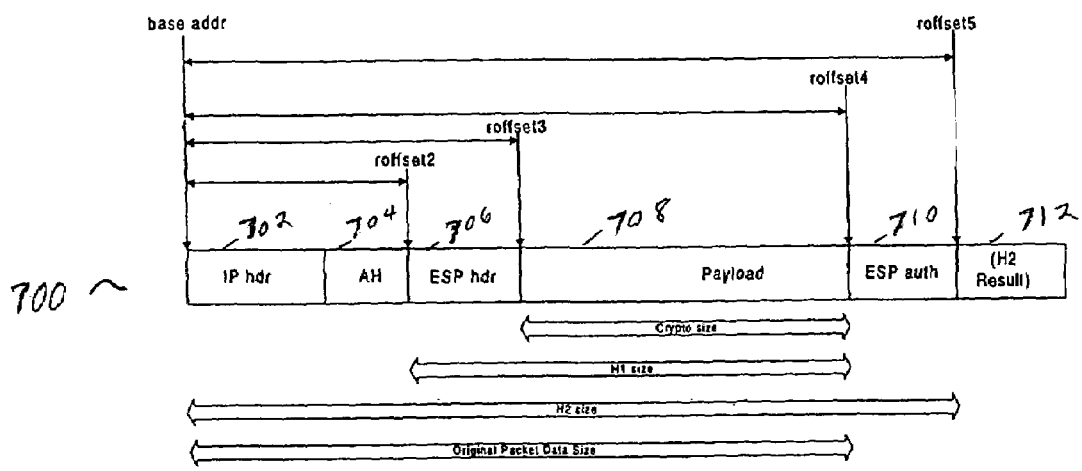
FIG. 7 is a block diagram illustrating outbound packet processing.

FIG. 7 is a block diagram illustrating outbound packet processing. A packet 700 initially comprises an IP header 702, an AH portion 704, an ESP header 706 and a payload (i.e., data) 708. For outbound packet processing, the payload 708 is encrypted with the cryptography core 108. Then, the H1 core 110 authenticates the encrypted payload 708 by adding an ESP authentication 710. Next, the H2 core 112 authenticates the encrypted packet 700 and the ESP authentication 710 by adding another authentication code (i.e., H2 result) 712.

Figure 8:
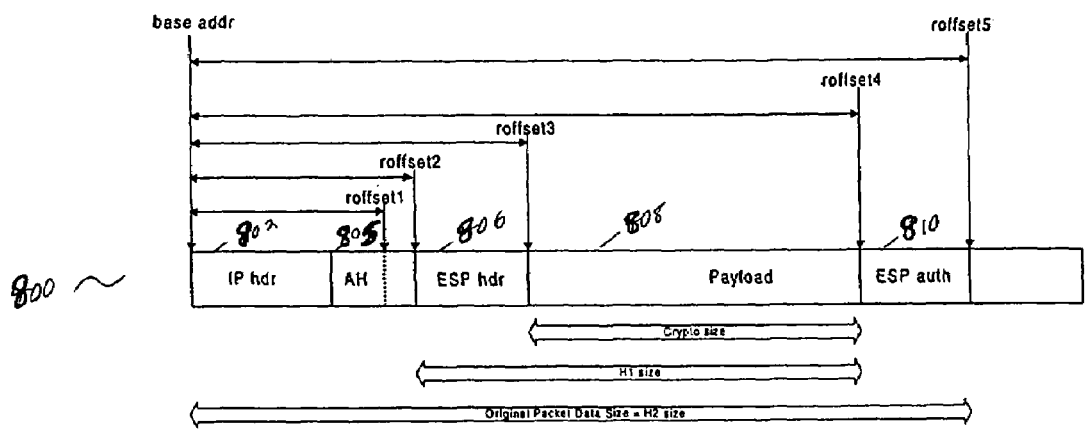
FIG. 8 is a block diagram illustrating inbound packet processing.

FIG. 8 is a block diagram illustrating inbound packet processing. A packet 800 is received. The authentication added by the H2 core 112 is placed by the transmitting host into the AH portion 805 before processing the packet. Upon receiving the packet 800, the packet processor 404 performs authentication and compares the results against the ESP authentication 810 and the AH authentication information 805. The packet processor 404 also decrypts the encrypted data 808.

If the authentication is not valid, indicating that the packet may be invalid, the decrypted data is discarded. Although the packet processor 404 may be programmed to perform authentication verification first, and then perform decryption only if the authentication is valid, in preferred embodiments the packet processor 404 is programmed to perform authentication and decryption at the same time to minimize overall processing time and significantly improve throughput.

Packet Processor Registers and Memories

The following Table A indicates a representative example of the packet processor's 404 registers and memories. All offset and size registers are 16-bit wide and indicate the number of bytes. However, the packet processor 404 ignores the two least significant bits since everything has to be on a 32-bit boundary. All offset registers increment while executing the Write_data instruction.

TABLE A

| CU Reg/mem | PLB R/W | PLB Addr [11:2] | PP Local Bus Addr (6:0) | Description |
|---|---|---|---|---|
| Offset Registers 0 | r only | 000 | 00 | |
| Offset Registers 1 | r only | 001 | 01 | Crypto start offset |
| Offset Registers 2 | r only | 002 | 02 | H1 start offset |
| Offset Registers 3 | r only | 003 | 03 | H2 start offset |
| Size Registers 0 | r only | 004 | 04 | Total packet data size |
| Size Registers 1 | r only | 005 | 05 | Crypto size |
| Size Registers 2 | r only | 006 | 06 | H1 size |
| Size Registers 3 | r only | 007 | 07 | H2 size |
| Crypto Command | | | 08 | Command formed from PCR, CSR, and Config Reg |
| H1 Command | | | 09 | Command formed from PCR, CSR, and Config Reg |
| H2 Command | | | 0A | Command formed from PCR, CSR, and Config Reg |
| Status Destination Address Register | r only | 00B | 0B | Address for packet status |
| Offset Registers 4 | r only | 00C | 0C | |
| Offset Registers 5 | r only | 00D | 0D | Crypto end offset |
| Offset Registers 6 | r only | 00E | 0E | H1 end offset |
| Offset Registers 7 | r only | 00F | 0F | H2 end offset |
| Instruction RAM Pointer | r/w | 010 | | Store offset for instruction RAM |
| Command/Status Register | r/w | 011 | | Control packet processor (see bit definitions) |
| Packet Status | r only | 012 | | Packet status |
| Source Address Register | r only | 013 | | Starting address for packet control structure |
| Configuration Register | r/w | 014 | | Control packet processor (see bit definitions) |
| Packet Command Register | r only | 015 | 15 | Select techniques and mode (see bit definitions) |
| Base Address Register | r only | 016 | 16 | Starting address for packet data (input) |
| Destination Address Register | r only | 017 | 17 | Starting address for packet results (output) |
| Mask RAM (0–7) | r/w | 018–01F | 18–1F | |
| InFIFO/OutFIFO | r/w | 020–03F | | |
| Command FIFO | r*/w | 040 | | instruction RAM offset |
| Command FIFO | T*/w | 041 | | pkt control structure address (load FIFO) |
| Instruction RAM (512 locations) | r/w | 200–3FF | | |
| Crypto Registers | | | 20–213 | |
| H1 Registers | | | 40–4F | |
| H2 Registers | | | 60–6F | | r* = reading command FIFO via PLB bus does not advance FIFO pointer

Packet Processor Instructions

The following Table B provides a representative example of packet processor 404 instructions.

TABLE B

| Instructions | Description |
|---|---|
| Load [#words] | [#word] - 10 bits wide Load the specified number of 32-bit words into the Source Size Register and start transferring data into the CU InFIFO using the PLB Master Read interface until size reaches zero The Source Address Register specifies the source address. If the InDMA Enable bit of the command register is clear, no data transfer will occur. |
| Storex [start address] [count] | [start address] - 7 bits wide [count] – 3 bits wide Store [count + 1] words from the CU InFIFO (unmodified, except as mentioned below) to registers/memory beginning from the specified [start address]. Destinations supported for this instruction are the following: CU: Mask RAM, Base Address Register, Destination Address Register, Status Destination Address Register, Packet Command Register, Offset registers (0–7), and Size Registers (0–3). Cores: All registers in the Crypto, H1, and H2 cores. Need to execute the Wait instruction to make sure the cores are ready to accept data. Storing size to Size Register I also cause (i) Crypto end offset to be computed and stored in Offset Register 5 and (ii) Crypto destination address to be computed and. stored in Crypto Destination Address Register. Storing size to Size Register 2 also cause (i) H1 end offset to be computed and stored in Offset Register 6 and (ii) H1 destination address to be computed and stored in H1 Destination Address Register. Storing size to Size Register 3 also cause (i) H2 end offset to be computed and stored in Offset Register 7 and (ii) H2 destination address to be computed and stored in H2 Destination Address Register. This instruction can also be used to load |

TABLE B-continued

| Instructions | Description |
| --- | --- |
| | commands (based on the information provided in the Configuration Register, Command Register, Packet Command Register, and Size Registers) for the Crypto, H1, and H2 cores by using the addresses (008, 0x09, and 0x0A), respectively. Need to execute the Wait instruction to make sure the cores are ready to accept data. |
| Start new base | Load Base Address Register into Source Address Register, load Size Register 0 into Source Size Register, and start transferring data into the CU InFIFO using the PLB Master Read interface until size reaches zero. If OutDMA Enable bit of the Command Register is set, the PLB Master write interface of the control unit is also enabled at this time. If the InDMA Enable bit of the command register is clear, no data transfer will occur. Note that this instruction executes in one clock and no conditions are checked. |
| Write_statblk | Form command for the Status block based on the information specified in the Packet Command Register. Wait until the Status block is not busy and then write the command to the Status Command Register. Writing to the Status Command Register also causes the Status block to load the buffered status destination address to the current destination address register. This instruction also generates pulses for H1 and H2, if the cores are enabled, to latch in the expected ICV from the respective buffers. |
| Write_data [write cfg][offset reg] | [write cfg] - 6 bits wide (active high) Bit 5 H1 1CV Write Enable -- enable writing to H1 Expected ICV Register. Bit 4 H1 InFIFO Write Enable -- enable writing to H1 InFIFO. Bit 3 H2 ICV Write Enable -- enable writing to H2 Expected ICV-Register. Bit 2 - H2 InFIFO Write Enable -- enable writing to H1 InFIFO. Bit I Crypto InFIFO Write Enable -- enable writing to Crypto InFIFO. Bit 0 CU OutFIFO Write Enable - enable writing to CU OutFIFO. [offset reg] - 3 bits wide (selects one of 8 offset registers) Broadcast the number of words specified by the selected offset register from the CU InFIFO to the destinations specified by the write configurations. If the destination is a FIFO, the FIFO full flag is checked before writing. Byte masking for H1 and H2 takes effect while executing this instruction, if enabled. |
| Wait [condition] | [condition] - 8 bits wide bit 7 - H1 not busy bit 6 - H1 buffer not full bit 5 - H1 InFIFO available bit 4 - H2 not busy bit 3 - H2 buffer not full bit 2 - H2 InFIFO available bit I - Crypto not busy bit 0 - CU OutFIFO empty Wait until the specified conditions are met. |
| Write [function select] | [function select] - 3 bits wide Bit 0 - Write Status Destination Address -- compute and write the destination address for the Status block. Bit I - Write All -- command the control unit to write the remaining content of the OutFIFO to memory. If sequential output is enabled, this command is necessary (even if OutFIFO has nothing to write out) in order to pass on the token. Bit 2 - Reset OutFIFO - generates pulse to reset CU OutFIFO. |
| Stop | Note that these functions execute in one clock and no conditions are checked. Reset CU InFIFO. Reset Mask RAM read address pointer and mask logic. Wait for CU OutFIFO to finish writing out data. Start processing the next command if applicable (depend on control bits in the Command Register and Configuration Register) |

Command FIFO Format

The Command FIFO format is 8 bits deep and 41-bit wide. The following is the format:

Bits [40:32] specify the instruction RAM offset. This field is updated by writing to PLB address 0x040 with the offset on bits [8:0] of the data bus. This field is stored in a 9-bit register and is entered into the Command FIFO when the packet control structure address is updated.

Bits [31:01] specify the packet control structure address. Writing to PLB address 0x041 causes the entire 41 bits to be loaded into the Command FIFO.

Outbound Packet Processing Instructions

The following Table C provides a representative example of instructions used in outbound packet processing:

TABLE C

| Instructions | Packet Control Structure |
| --- | --- |
| load [39] | |
| store [base addr] | base addr |
| storex [offset reg 2, 41 | offset 2 [begin of H1] |
| | offset 3[begin of Encr] |
| | offset 4[end of Encr & H1, begin of H1 result] |
| | offset 5[begin of H2 result] |
| storex [size reg 0, 4] | size 0[original packet data] |
| | size 1 [112] |
| | size 2[H1] |
| | size 3[Encr] |
| storex [mask FIFO, 21 | mask bytes[O (leftmost) - 3 11 |
| | mask bytes[32–631 |
| storex [crypto key reg 0, 61 | 3DES key 1 [63:32] |
| | 3DES key 1[31:001 |
| | 3DES key 2 [63:32] |
| | 3DES key 2[31:001 |
| | 3DES key 3 [63:321 |
| | 3DES key 3[31:001 |
| storex [crypto iv reg 0, 21 | 3DES IV [63:32] |
| | 3DES IV P 1:001 |
| storex [H1 hash reg 0, 51 | HMAC I Inner IV, word 0 |
| | HMAC I Inner IV, word 1 |
| | HMAC I Inner IV, word 2 |
| | HMAC I Inner IV, word 3 |
| | HMAC I Inner IV, word 4 |
| storex [H1 IVouter reg 0, 5] | HMAC I Outer IV, word 0 |
| | HMAC I Outer IV, word 1 |
| | HMAC I Outer IV, word 2 |
| | HMAC I Outer IV, word 3 |
| | HMAC I Outer IV, word 4 |
| storex [H2 hash reg 0, 5] | HMAC 2 Inner IV, word 0 |
| | HMAC 2 Inner IV, word I |
| | HMAC 2 Inner IV, word 2 |
| | HMAC 2 Inner IV, word 3 |
| | HMAC 2 Inner IV, word 4 |

TABLE C-continued

| Instructions | Packet Control Structure |
|---|---|
| storex [H2 IVouter reg 0, 5] | HMAC 2 Outer IV, word 0 |
| | HMAC 2 Outer IV, word I |
| | HMAC 2 Outer IV, word 2 |
| | HMAC 2 Outer IV, word 3 |
| | HMAC 2 Outer IV, word 4 |
| | Comments |
| start new base | read pkt data into InFIFO |
| write_dest [crypto dest addr reg, r3] | (=destination addr + offset reg |
| write [crypto cmd reg, data] | start crypto(write cmd & size reg 3) |
| write_dest [H 1 des addr reg, r4] | (=destination addr + offset reg) |
| write [H1 cmd reg, data] | start H1 (write cmd & size reg 2) |
| write dest [H1 des addr reg, r5] | (=destination addr + offset reg) |
| write [H2 cmd reg, data] | start H2(write cmd & size reg 1) |
| write [ICVchecker/stat cmd reg, data] | start ICV check/status reporting (enable crypto, H1 & H2 status reporting - status will be written to [Control Structure address + a fixed offset]) |
| write-until0 [offset reg 2, write cfg] | write CU InFIFO data to H2 and CU OutFIFO until reach offset 2 (H2 byte mask ena) |
| write-until0 [offset reg 3, write cfg] | write CU InFIFO data to H1, H2 and CU OutFIFO until reach offset 3 (H2 byte mask ena) |
| *wait [CU OutFIFO empty] | wait until CU OutFIFO is empty (for sequential outputs) |
| write_until0 [offset reg 4, write cfg] | write CU InFIFO data to crypto until reach offset 4; H1 & H2 receives data from crypto |
| wait [H2 not busy] stop | wait until H2 is done (for sequential outputs) |

*If destination is RAM, remove these instructions to improve performance.

The following Table D provides a representative example of instructions used in outbound packet processing:

TABLE D

| Instructions | Packet Control Structure |
|---|---|
| load [39] | |
| store [base addr] | base addr |
| storex [offset reg 1, 51 | offset I [begin of H2 ICV] |
| | offset 2[begin of H11] |
| | offset 3[begin of Encr] |
| | offset 4[end of Encr & Ill, begin of Ill result] |
| | offset 5[end of H2] |
| storex [size reg 0, 3] | size O[entire packet data = H2 size] |
| | size 1[H1] |
| | size 2[Encr] |
| storex [mask FIFO, 2] | mask bytes[O (leftmost) - 3 1 |
| | mask bytes[32–63] |
| storex [crypto key reg 0, 6] | 3DES key 1 [63:32] |
| | 3DES key 1[31:00] |
| | 3DES key 2 [63:32] |
| | 3DES key 2[31:00] |
| | 3DES key 3 [63:321 |
| | 3DES key 3[31:00] |
| storex [crypto iv reg 0, 2] | 3DES IV [63:321 |
| | 3DES IV [31:00] |
| storex [111 hash reg 0, 51 | HMAC 1 Inner IV, word 0 |
| | HMAC 1 Inner IV, word I |
| | HMAC I Inner IV, word 2 |
| | HMAC 1 Inner IV, word 3 |
| | HMAC I Inner IV, word 4 |
| storex [111 outer reg 0, 5] | HMAC 1 Outer IV, word 0 |
| | HMAC I Outer IV, word 1 |
| | HMAC I Outer IV, word 2 |

TABLE D-continued

| Instructions | Packet Control Structure |
|---|---|
| | HMAC I Outer IV, word 3 |
| | HMAC I Outer IV, word 4 |
| storex [H2 hash reg 0, 5] | HMAC 2 Inner IV, word 0 |
| | HMAC 2 Inner IV, word I |
| | HMAC 2 Inner IV, word 2 |
| | HMAC 2 Inner IV, word 3 |
| | HMAC 2 Inner IV, word 4 |
| storex [H2 IVouter reg 0, 5] | HMAC 2 Outer IV, word 0 |
| | HMAC 2 Outer IV, word 1 |
| | HMAC 2 Outer IV, word 2 |
| | HMAC 2 Outer IV, word 3 |
| | HMAC 2 Outer IV, word 4 |
| | Comments |
| start new base | read Pkt data into CU InFIFO |
| write-dest [crypto dest addr reg, r3] | (=destination addr + offset reg |
| write [crypto cmd reg, data] | start crypto(write cmd & size reg 2) |
| write [H1 cmd reg, data] | start H1(write cmd & size reg 1) |
| write [112 cmd reg, data] | start H2(write cmd & size reg 0) |
| write [ICVchecker/stat cmd reg, data] | start ICV check/status reporting (enable crypto, H1, & H2 status reporting and H1 & H2 ICV checks - status will be written to [Control Structure address a fixed offset]) |
| write_until0 [offset reg 1, write cfg] | write CU InFIFO data to H2 and CU OutFIFO until reach offset I (H2 byte mask ena) |
| write_until0 [offset reg 2, write cfg] | write CU InFIFO data to H2, H2 ICV Checker and CU OutFIFO until reach offset 2 (H2 byte mask ena) |
| write-until0 [offset reg 3, write cfg] | write CU InFIFO data to H 1, H2 and CU OutFIFO until reach offset 3 (H2 byte mask ena) |
| *wait [CU OutFIFO empty] | wait until CU OutFIFO is empty (for sequential outputs) |
| write-until0 [offset reg 4, write cfg] | write CU InFIFO data to H 1, H2, and crypto until reach offset 4; |
| *wait [crypto not busy] | wait until crypto done writing out results(for seg. outputs) |
| write_until0[offset reg 5, write cfg] | write CU InFIFO data toH2, H1 ICV Checker and CU OutFIFO until reach offset 5; |
| *wait [CU OutFIFO empty] stop | wait until CU OutFIFO is empty (for sequential outputs) |

*If destination is RAM, remove these instructions to improve performance.

Control Unit Tables

The following Tables E, F, and G provide representative examples of registers in the control unit.

TABLE E

Control Unit - Configuration Register
(Writing to this register is allowed only when the packet processor is not busy, except for the Terminate and Stop bits.)

| Bits | Description |
|---|---|
| 31 | Terminate. This bit set commands the packet processor to stop immediately. The PPC needs to set the terminate bits of the cores as well if the cores are to stop execution. This bit can be modified at any time. |
| 30 | Stop When Empty. This bit set commands the packet processor to stop (once it is done executing the current command) when the command FIFO becomes empty. This bit is used only when the Execute. until Stop bit of the command register is set and DMA is enabled. This bit can be modified at any time. |
| 29 | Stop When Done. This bit set commands the packet processor to stop processing commands from the command FIFO once it is done executing the current command. This bit is used only when the Execute until Stop bit of the command register |

TABLE E-continued

Control Unit - Configuration Register
(Writing to this register is allowed only when the packet processor is not busy, except for the Terminate and Stop bits.)

| Bits | Description |
|---|---|
| | is set and DMA is enabled. This bit can be modified at any time. |
| 10 | H2 InFIFO Early Release Enable. not available yet. |
| 9 | |
| 8 | HMAC OutDMA Enable. This bit set specifies to always write out H1 and H2 results (via the PLB master write interface). This bit clear specifies to write out H1 and H2 results only when it is an outbound packet and the OutDMA Enable bit of the CU Command Register is set. |
| 7 | Packet Processor Enable. This bit selects between the two write interfaces of the Crypto, H1, and H2 cores. This bit set selects to use the interface to the packet processor control unit for write operations to the cores. This bit clear selects to use the PLB slave interface of the cores. |
| 6 | Instruction RAM Configuration Enable. This bit set allows the PPC to write to the Instruction RAM. This bit clear inhibits writing to the Instruction RAM. |
| 5 | Reset Command FIFO. This bit set commands the packet processor to reset the Command FIFO. This bit should be clear during normal operation |
| 4 | Sequential Output Disable. This bit clear commands the packet processor to write out packet processing results sequentially. This bit set commands the packet processor to write out results as they become available (not necessarily sequential). |
| 3:2 | Status Local Bus Priority[1:0]. These bits specify the priority of the status block on the local bus. 00 specify lowest priority; 11 specify highest priority. |
| 1:0 | FIFO Local Bus Priority[1:0]. These bits specify the priority of the PLB Master interfaces used for data transfer to/from the CU InFIFO and OutFIFO on the local bus. 00 specify lowest priority; 11 specify highest priority. |

TABLE F

Control Unit - Command/Status Register
(Writing to this register initiates packet processing.
Writing to this register is not allowed when the busy bit is set.)

| Register Bits | Description |
|---|---|
| 31 | Busy. This bit set indicates that the packet processor busy. This bit clear indicates that the packet processor is ready. This bit is read only. |
| 30 | Command FIFO Full. Ibis bit set indicates the command FIFO is full. This bit is read only. |
| 29 | Command FIFO Empty. This bit set indicates the command FIFO is empty. This bit is read only. |
| 5:4 | Execution Mode[1:0]. <br> 00 -- Execute Until Stop. This bit specifies to continuously execute commands from the command FIFO until one of the Stop bits in the configuration register is set. <br> 01 -- Execute Until Empty. This bit set specifies to continuously execute commands from the command FIFO until the FIFO becomes empty. <br> 1x -- Execute One Command. This bit set specifies to execute one command from the command FIFO and then stop. |
| 3 | OutDMA AutoIncrement Disable. This bit clear specifies to increment the destination address when using the PLB master, write interface to transfer data from the control unit OutFIFO, status block, and the cores. This bit set specifies not to increment the destination address. |
| 2 | OutDMA Enable. This bit set enables the control unit OutFIFO, status block, and the Crypto core to write out the results via their PLB master write interfaces. This bit set also enables H1 and H2 to write out results for outbound packet. This bit clear disables all PLB master write interfaces. |
| 1 | InDMA AutoIncrement Disable. This bit clear specifies to increment the source address when using the PLB master read |

TABLE F-continued

Control Unit - Command/Status Register
(Writing to this register initiates packet processing.
Writing to this register is not allowed when the busy bit is set.)

| Register Bits | Description |
|---|---|
| | interface to transfer data into the control unit, Crypto, H 1, and H2 InFIFOs. This bit set specifies not to increment the source address. |
| 0 | InDMA Enable. This bit set enables the control unit to execute commands from the command FIFO and to use the PLB master read interface to transfer data from memory to the control unit InFIFO. If this bit is clear, the PPC writes the instruction RAM offset, the packet control structure, and packet data to the control unit. |

TABLE G

Control Unit - Packet Command Register
(This register is written by the control unit only.)

| Register Bits | Description |
|---|---|
| 31 | H1 Mask Enable - This bit set enables byte masking of up to 256 bytes of data written to H1 InFIFO, beginning from the base address. Byte masking occurs while executing the Write-data instruction. This bit clear specifies not to mask data. |
| 30:28 | H1 Mask Size[2:0] - These bits selects the number of mask words to be applied. "000" selects to enable byte masking of the first 32 bytes of packet data. "001" selects to enable byte masking of the first 64 bytes of packet data. . . . "111" selects to enable byte masking of the first 256 bytes of packet data. |
| 27 | H1 Initialize Hash. This bit set specifies to use the default initial value specified by the technique as the starting hash value. Ibis bit clear specifies to use the value currently in the Hash Registers as the starting hash value. |
| 26 | H1 Final Block. This bit set specifies to append padding and complete the hash operation. If the HMAC technique is selected, the core will also perform the outer hash. This bit clear specifies that this is not the last block of the message and no padding/length should be appended. Note that size must be multiples of 512 bits if this bit is not set. |
| 25:24 | H1 Technique [1:0]. <br> 00 -- MD5 <br> 01 -- SHA-1 <br> 10 -- HMAC-MD5 <br> 11 -- HMAC-SHA-1 |
| 23 | H2 Mask Enable - This bit set enables byte masking of up to 256 bytes of data written to H2 InFIFO, beginning from the base address. Byte masking occurs while executing the Write-data instruction. This bit clear specifies not to mask data. |
| 22:20 | H2 Mask Size[2:0] - These bits selects the number of mask words to be applied. "000" selects to enable byte masking of the first 32 bytes of packet data. "001" selects to enable byte masking of the first 64 bytes of packet data. selects to enable byte masking of the first 256 bytes of packet data. |
| 19 | H2 Initialize Hash. This bit set specifies to use the default initial value specified by the technique as the starting hash value. This bit clear specifies to use the value currently in the Hash Registers as the starting hash value. |
| 18 | H2 Final Block. This bit set specifies to append padding and complete hash. If HMAC technique is selected, the core will also perform the outer hash. This bit clear specifies that this is not the last block of the message and no padding/length should be appended. Note that size must be multiples of 512 bits this bit is not set. |
| 17:16 | H2 Technique[1:0]. <br> 00 -- MD5 <br> 01 -- SHA-1 <br> 10 -- HMAC-MD5 <br> 11 -- HMAC-SHA-I |
| 15 | H1 Length/Ipad/Opad Select. When the initialize bit is set and the final bit is clear, this bit is used to select ipad/opad: this bit set specifies to use the HMAC ipad to perform the HMAC |

TABLE G-continued

Control Unit - Packet Command Register
(This register is written by the control unit only.)

| Register Bits | Description |
|---|---|
| | initialization only command; this bit clear specifies to use the HMAC opad to perform the HMAC initialization only command Otherwise, this bit is used to select the source of message length: this bit set specifies to use the contents of the Length Registers as the length of the message; this bit clear specifies to use Size as the length of the message. |
| 14 | H2 Length/Ipad/Opad Select. When the initialize bit is set and the final bit is clear, this bit is used to select ipad/opad: this bit set specifies to use the HMAC ipad to perform the HMAC initialization only command; this bit clear specifies to use the HMAC opad to perform the HMAC initialization only command. Otherwise, this bit is used to select the source of message length: this bit set specifies to use the contents of the Length Registers as the length of the message; this bit clear specifies to use Size as the length of the message. |
| 13 | Crypto 3DES Keys for Decryption. This bit set specifies that keys 1,2, and 3 are in the order for decryption and that the order of the keys should be reversed if encryption mode is selected. This bit clear specifies that keys 1,2, and 3 are in the order for encryption and that the order of the keys should be reversed if decryption mode is selected. |
| 12 | Crypto Initialize RC4. This bit set specifies to initialize the RC4 Sbox with the key loaded in the key registers. This bit clear specifies to use the key stream which is currently in the RC4 Sbox Registers. |
| 11:8 | Crypto Technique[3:0]. bit 3: 1 = RC4 0--DES/3DES; bit 2: 1= 3DES O= DES; bit 1: 1 = ECB 0= CBQ bit 0: 1= decryption 0= encryption |
| 7 | Core InDMA Enable. This bit set enables the Crypto, H1, and H2 cores to fetch their own data (for the InFIFOs) using their PLB Master read interfaces. The daisy chain bus is disabled and all cores operate independent from each other. The status of the cores may still be reported by the status block. This bit clear specifies that the cores receive their data from the control unit. |
| 6 | Crypto Enable. This bit set indicates that the Crypto core is required for the processing of this packet. This bit clear indicates that the Crypto core is not required for the processing of this packet. This bit is used to enable the status reporting for Crypto, determine the destination address for status block, and gate write operations to Crypto registers and InFIFO. |
| 5 | H1 Enable. This bit set indicates that H1 core is required for the processing of this packet. This bit clear indicates that H1 core is not required for the processing of this packet. This bit is used to enable the status reporting for H1, determine the destination address for status block, gate write operations to H1 registers and InFIFO, and enable daisy chain outputs. |
| 4 | H2 Enable. This bit set indicates that H1 core is required for the processing of this packet. This bit clear indicates that H1 core is not required for the processing of this packet. This bit is used to enable the status reporting for H1, determine the destination address for status block, gate write operations to H1 registers and InFIFO, and enable daisy chain outputs. |
| 3:2 | Mode Select[1:0] -00 - selects to use only the leftmost 96 bits of hash results. 01 - selects to use only the leftmost 128 bits of hash results. Ix - selects to use the entire hash results. |
| I | Inbound Packet. This bit set indicates that this is an inbound packet. This bit clear indicates that this is an outbound packet. |
| 0 | Endian. This bit set specifies that the packet data to be processed is in little endian format. This bit clear specifies that the packet data to be processed is in big endian format. This bit also specifies the endian format for outputs from the packet processor, except for authentication values and status. Note that data in the Mask RAM must before packet data in big endian format. |

Status Block

The following Table H provides a representative example of the status block command and status register:

TABLE H

Status Block
Command/Status Register

| Register Bits | Description |
|---|---|
| 31 | Completed packet processing. This bit set indicates that packet processing has completed. This bit clear indicates that the packet is not yet processed or that processing has not completed. This bit is cleared when writing to this register. |
| 30:24 | Reserved. Read as zero. |
| 23 | Crypto Status Enable. This bit set specifies to report Crypto status. |
| 22 | Crypto Done. This bit set indicates that the Crypto block has completed processing. This bit is cleared when writing to this register. |
| 21 | Crypto Key error. This bit indicates either RC4 key length error or DES/3DES key parity error, depending on the technique, as follows: RC4: This bit set indicates that the key length is 0 or greater than 32 bytes when the Initialize RC4 bit is set. DES/3DES: This bit set indicates that the keys (key 1 for DES; key 1/2/3 for 3DES) contain parity error. This bit is cleared when each byte of the keys has odd parity. This error does not stop processing. This bit is cleared when writing to this register. |
| 20:16 | Reserved. Read as zero. |
| 15 | H2 Status Enable. This bit set specifies to report H2 status. |
| 14 | H2 Done. This bit set indicates that the H2 has completed processing. This bit is cleared when writing to this register. |
| 13 | H2 Size Error. This bit set specifies that Size is not an even multiple of 64 bytes and the Final Block bit is low; no hashing will be performed. This bit clearly specifies that Size is valid. This bit is cleared when writing to this register |
| 12 | H2 ICV Check Enable. This bit set specifies to compare H2 result with H2 authentication value from the inbound packet. |
| 11 | H2 ICV Check Status. This bit set indicates that H2 ICV match. This bit clear indicates the comparison failed. This bit is cleared when writing to this register. |
| 10:8 | Reserved. Read as zero. |
| 7 | H1 Status Enable. This bit set specifies to report H1 status. If this bit is clear, ignore the H1 status bits.. |
| 6 | H1 Done. This bit set indicates that the H1 has completed processing. Ibis bit is cleared when writing to this register. |
| 5 | H1 Size Error. This bit set specifies that Size is not an even multiple of 64 bytes and the Final Block bit is low; no hashing will be performed. This bit clearly specifies that Size is valid. This bit is cleared when writing to this register |
| 4 | H1 ICV Check Enable. This bit set specifies to compare H1 results with H1 authentication value from the inbound packet. |
| 3 | H1 ICV Check Status. This bit set indicates that H1 ICV match. This bit clear indicates the comparison failed. This bit is cleared when writing to this register |
| 2:0 | Reserved. Read as zero. |

IP Security Encryption Techniques

The goal of the IP security encryption techniques is to do the following transformations:

DES-ECB and CBC

3DES-ECB and outer CBC

RC4

The code performance of the IP security encryption techniques are as follows:

DES: 8 bytes/8 clocks

3DES: 8 bytes/24 clocks

RC4: I byte/I clock (Initialization: 384 clocks)

The following Table I provides a representative example of additional information about the IP security encryption techniques:

TABLE I

| Command | Technique | RC4 Init | 3DES keys for decr | Data req'd | Function |
|---|---|---|---|---|---|
| DES CBC complete | DES CBC encr/decr | x | x | key, IV, text | Perform complete DES CBC encryption or decryption |
| DES ECB complete | DES ECB encr/decr | x | x | key, text | Perform complete DES ECB encryption or decryption. |
| 3DES outer CBC complete | 3DES CBC encr/decr | x | y/n | key, IV, text | Perform complete 3DES outer CBC encryption or decryption. |
| 3DES ECB complete | 3DES ECB encr/decr | x | y/n | key, text | Perform complete 3DES ECB encryption or decryption. |
| RC4 complete | RC4 encr/decr | y | x | key length, key, text | Perform complete RC4 encryption or decryption. |
| RC4 without init | RC4 encr/decr | n | x | text | Perform RC4 encryption or decryption without initializing (continue from preceding processing). |

In one preferred representative example, the Crypto block 108 performs RC4, DES and 3DES encryption techniques. Input text is either read in by the PLB Master read interface or provided by the packet processor control unit 106. The Crypto block begins execution following the writing to the Command/Status Register. The completion of processing is indicated by the transition of the Busy bit in the Command/Status Register from a one to a zero.

As a representative example, the PLB Address for the Crypto Configuration Register is: 0x000200, and this register can be updated at any time. The following Table J provides a representative example of information about the crypto configuration register:

TABLE J

| Register Bits | Description |
|---|---|
| 26:25 | Local Bus Priority[1:0]. These bits specify the priority of this block on the local bus. 00 specify lowest priority; 11 specify highest priority. |
| 24 | Terminate. This bit set specifies to terminate the current process. This bit should normally be set to low. Writing to this bit is always allowed. |

Further to the above representative example, the PLB Address of the Key Length Register is: 0x000204. This 6-bit register contains the key length in number of bytes. Maximum key length is 32 bytes. READ and WRITE are not allowed while RC4 Init Busy is high. The PLB Addresses of the Key Registers are: 0000208, 0x00020C, 0000210, 0000214, 0000218, 000021C, 0000220, 0x000224. These 8 32-bit registers store the key. The register at PLB address 0x208 holds the most significant word, with the leftmost character of the key in the 31:24 bit position.

For DES and 3DES, the following are keys and associated registers:

Key 1 [63:0] is stored in registers at PLB address [0000208 000020C].
Key 2 [63:0] is stored in registers at PLB address [0000210 0000214].
Key 3 [63:0] is stored in registers at PLB address [0000218 000021C].

Each 64-bit key is loaded into the DES/3DES engine the same clock cycle when a write to the later address (000020C, 0000214, 0x00021C) is performed. Moreover, READ and WRITE operations are not allowed while RC4 Init Busy is high.

In the above-representative example, the PLB Addresses for the DES IV Registers are: 0000228, 0x0022C. These 2 32-bit registers store the initialization vector for DES/3DES CBC mode. The register at PLB address 0x00228 holds the most significant 32-bit word, with the leftmost character of the vector in the 31:24 bit position. WRITE operations are not allowed while Busy is high.

Further to the above representative example, the PLB Address of the Source Address Register is: 0x000230. This 32-bit source address register points to the location where the input data to the crypto block will be read. The PLB Address of the Destination Address Register is: 0x000234. This 32-bit destination address register points to the location where the output data from the hash block will be written.

Further to the above example, the PLB Address for the Crypto Command/Status Register is: 0x000238. Writing to this register starts the Crypto block processing. Writing to this register is inhibited while the busy bit is set. A representative example of this register is defined in Table K, which the "crypto" command/status register information.

TABLE K

| Register Bits | Description |
|---|---|
| 31 | Busy. This read-only bit set indicates that the Crypto block is processing. This bit clear indicates that the Crypto block is idle and is ready for a new command. |
| 30 | RC4 Initialization Busy. This status bit is set while RC4 is initializing. |
| 29 | Key error. This bit indicates either RC4 key length error or DES/3DES key parity error, depending on the technique, as follows: RC4: This bit set indicates that the key length is 0 or greater than 32 bytes when the Initialize RC4 bit is set. Neither initialization nor encryption will be performed. Writing to this register clears this bit. DES/3DES: This bit set indicates that the keys (key I for DES; key 1/2/3 for 3DES) contain parity error. This bit is cleared when each byte of the keys (key 1 for DES; keys 1&2&3 for 3DES) is of odd parity. This error does not stop processing. |
| 28 | DCout To H1 Enable. This bit set enables the core to pass the resulting text to H1 on the daisy chain bus. |
| 27 | DCout To H2 Enable. This bit set enables the core to pass the resulting text to H2 on the daisy chain bus. |
| 26 | OutDMA AutoIncrement. This bit set specifies to enable the PLB master write interface to increment destination address. |
| 25 | OutDMA enable. This bit set specifies to use the DMA bus for output transfers. |
| 24 | 3DES Keys for Decryption. This bit set specifies that keys 1,2, and 3 are in the order for decryption and that the are in the order for encryption and that the order of the keys should be reversed if technique[0] is set for decryption. |
| 23:20 | Technique[3:0] bit 3: 1= RC4 0--DES/3DES; bit 2: I= 3DES 0= DES; bit 1: I= ECB 0-- CBQ bit 0: 1= decryption 0-- encryption |
| 19 | Initialize RC4. This bit set specifies to initialize the RC4 Sbox with the key loaded in the key registers. This bit clear specifies to use the key stream which is currently in the RC4 Sbox Registers. |

TABLE K-continued

| Register Bits | Description |
|---|---|
| 18 | InDMA AutoIncrement. This bit set specifies to enable the PLB master read interface to increment destination address. |
| 17 | InDMA enable. This bit set specifies to use the DMA bus for input transfers. |
| 16 | Endian. This bit set specifies that the format of the data to/from the 64-bit FIFO is little endian. This bit clear specifies that the format of the data to/from the 64-bit FIFO is big endian. Note that endianness refers to the byte ordering within 32-bit words. |
| 15:0 | Size. Writing to these bits specifies the number of bytes to be encrypted. Reading of this field indicates the number of bytes remaining to be processed and read out. For DES/3DES, size must be an integral of 64-bit words. |

Further to the above example, the PLB Address for the FIFO is: 0x100000–0X1FFFFF. The InFIFO and OutFIFO may be accessed using an address in the above address range. The Endian bit in the Command/Status register must be written to indicate the byte ordering of the data to be written to and read from the FIFOs. Data is written into the InFIFO. Data is read from the OutFIFO. The FIFOs are accessible via the PLB bus only when the DMA enable bit is set low.

IP Security HMAC Block

The IP security HMAC blocks may use one or a combination of the following authentication techniques:

HMAC-MD5 (–96)
HMAC-SHA-I (–96)
MD5
SHA-1

The HMAC technique is a keyed hashing technique for message authentication. The HMAC technique operates in combination with a hash function and requires a key. The following equation describes the HMAC technique:

Hash (Key XOR opad, Hash (Key XOR ipad, text));

For higher performance, the technique may generate the inner IV (Hash (Key XOR ipad)) and outer IV (Hash (Key XOR opad)) for each key and store them for later use. When keyed hashing is required, the stored inner IV and outer IV stored for that key are provided, and the HMAC update or HMAC update and final command are used to perform the hash. Table L provides a representative example of authentication commands.

TABLE L

| Cmd | Tech. | Init | Final Blk | Opad/ Ipad | Len Src | Data req'd | Function |
|---|---|---|---|---|---|---|---|
| HMAC complete | HMAC MD5/ SHA-1 | y | y | x | size/ len | key, text | Perform complete HMAC func. (only support key size of 160 bits for SHA-1 and 128 bits for MD5) |
| HMAC inner init | HMAC MD5/ SHA-1 | y | n | ipad | x | key | w/default IV, Key XOR ipad, hash 64B. |
| HMAC outer init | HMAC MD5/ SHA-1 | y | n | opad | x | key | Generate IVouter by init hash w/default IV, Key XOR opad, hash 64B |
| HMAC update | HMAC MD5/ SHA-1 | n | n | x | x | IVinne, text | Hash text using provided IVinner |
| HMAC update and final | HMAC MD5/ SHA-1 | n | y | x | size/ len | Ivinne, Ivouter, text | Hash text, with padding appended, using the provided IVinner, and then perform the outer hash from IVouter |
| Hash complete | MD5/ SHA-1 | y | y | X | size/ len | text | Perform complete hash function |
| Hash init and update | MD5/ SHA-1 | y | n | X | x | text | Initialize with hash default IV an then hash text |
| Hash update and final | MD5/ SHA-1 | n | y | X | size/ len | IV, text | Hash text, with padding appended, using the provided IV. |

The HMAC block performs Keyed-hashing for message authentication and hash techniques SHA-1 and MD5. Input data is either read in by the PLB Master read interface or provided by the packet processor control unit. The HMAC block begins execution following the writing to the Command/Status Register. Processing is completed when the Busy bit in the Command/Status Register transitions from a one to a zero.

Further to the above example, the PLB Address of the HMAC Configuration Register is [5:2]: 0x0. This register can be updated at any time. The following Table M provides a representative example of HMAC configuration register information.

TABLE M

| Register Bits | Description |
|---|---|
| 26:25 | Local Bus Priority[1:0]. These bits specify the priority of this block on the local bus. 00 specify lowest priority; 11 specify highest priority. |
| 24 | Terminate. This bit set specifies to terminate the current process. This bit should normally be set to low. Writing to this bit is always allowed. |

The PLB Addresses for the Length Registers are—0x1, 0x2. The 61-bit length indicates the number of bytes in the message. Register at PLB address 0x 1 contains the lower 32-bit word. Register at PLB address 0x2 contains the upper 29 bits.

The PLB Addresses for the Outer IV Register are: 0x3–0x7. These registers store the outer initial value for HMAC.

The PLB Addresses for the Hash Register are: 0x8–0xC. These registers store the hash value. Reading these registers returns the hash value of the last 512 bit block, which has been hashed. Writing to these registers sets the initial hash value for the next block to be hashed (this is also referred to as the inner initial value for HMAC). The register at PLB address 0x8 contains the most significant word. The register at PLB address 0xC is not used for MD5. Hash values read from the registers should be written back to the registers the same way. The final result begins with the high-order byte of regAA (PLB address 0x8) and ends with the low-order byte of regDD (PLB address 0xB) for MD5 and of regEE (PLB address 0xC) for SHA-1, with the following:

MD5=>A3 A2 A1 . . . B3 . . . C3 . . . D3D2DI D0

SHA-1->A3 A2 A1 . . . B3 . . . C3 . . . D3 . . . E3 E2 E1 E0

(i.e., byte swapping is automatically done for the final MD5 block to achieve the above result).

The PLB Address for the Source Address Register is: 0xD. This 32-bit source address register points to the location where the input data to the hash block will be read.

The PLB Address for the Destination Address Register is: 0xE. This 32-bit destination address register points to the location where the output data from the hash block will be written.

The PLB Address for the HMAC Command/Status Register is: 0xF. Writing to this register starts the HMAC block processing. Writing to this register is inhibited while the busy bit is set. The following Table N contains a representative example of HMAC command/status register information.

TABLE N

| Register Bits | Description |
| --- | --- |
| 31 | Busy. This read-only bit set indicates that the core is processing. This bit clear indicates that the core is idle and is ready for a new command. |
| 30 | Size Error. This bit set specifies that Size is not an even multiple of 64 bytes and the Final Block bit is low; no hashing will be performed. This bit clear specifies that Size is valid. This bit is set to high by the hash block. Writing to this register clears this bit. |
| 29:28 | Mode Select[1:0].<br>00 use the leftmost 96 bits of the hash value<br>01 use the leftmost 128 bits of the hash value<br>1x use the entire hash value (160 bits for SHA-1, 128 bits for MD5) |
| 27 | DCout Enable. This bit set enables the core to pass the hash value to the next core on the daisy chain bus. This bit clear specifies not to write out the hash value. The number of words transferred is selected by the mode select bits. This bit is for H1 only. This bit should be clear for H2. |
| 26 | OutDMA AutoIncrement. This bit set enables the PLB master write interface to increment the destination address. |
| 25 | OutDMA enable. This bit set specifies to use the DMA bus for output transfers. |
| 24 | InFIFO Early Release Enable. This bit set specifies to release the InFIFO when it is only waiting for data from H1 (as in [AH] [ESP with authentication]). This occurs when the remaining size to be processed equal to the number of words specified by mode select bits. This bit is for H2 only. This bit should be clear for H1. |
| 23 | Initialize Hash. This bit set specifies to use the default initial value specified by the technique as the starting hash value. This bit clear specifies to use the value currently in the Hash Registers as the swing hash value. |
| 22 | Final Block. This bit set specifies to append padding and complete hash. If HMAC technique is selected, the core will also perform the outer hash. This bit clear specifies that this is not the last block of the message and no padding/length should be appended. Note that size must be multiples of 512 bits this bit is not set. |
| 21:20 | Technique[1:0].<br>00 -- MD5<br>01 -- SHA-I |

TABLE N-continued

| Register Bits | Description |
| --- | --- |
| | 10 - HMAC-MD5<br>11 - HMAC-SHA-1 |
| 19 | Length/Ipad/Opad Select.<br>When the initialize bit is set and the update and finish bits are clear, this bit is used to select ipad/opad: this bit set specifies to use the HMAC ipad to perform the HMAC initialization only command; this bit clear specifies to use the HMAC opad to perform the HMAC initialization only command. Otherwise, this bit is used to select the source of message length: this bit set specifies to use the contents of the Length Registers as the length of the message; this bit clear specifies to use Size as the length of the message. |
| 18 | InDMA AutoIncrement. This bit set enables the PLB master read interface to increment the source address. |
| 17 | InDMA enable. This bit set enables the core to DMA in the input text. This bit clear specifies that input data will come from either the control unit or the daisy chain bus (when the direct path signal is active). |
| 16 | Endian. This bit set specifies that data to be transferred into the InFIFO is in little endian format. This bit clear specifies that data to be transferred into the InFIFO is in big endian format. Endian conversion is done here. |
| 15:0 | Hash Size. These bits specify the number of bytes to be hashed. Writing to these bits specifies the number of bytes to be hashed. Reading from this register indicates the number of bytes remaining to be hashed. When performing HMAC initialization only command (to generate HMAC IVinner/IVouter), this size indicates the number of bytes in the key. |

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A packet processor comprising:
a control unit having a data input;
at least one encryption processor;
a first authentication processor;
a second authentication processor;
a local data bus, independent of the data input to the control unit, coupling the control unit to each of the encryption and authentication processors; and
a second data bus from the encryption processor to each authentication processor, including a data bus from the first authentication processor to the second authentication processor
wherein the control unit is configured to control the at least one encryption processor and the first and second authentication processors such that a first set of data and a second set of data sent from the at least one encryption processor to the first authentication processor and the second authentication processor, respectively, are processed by the first authentication processor and the second authentication processor while the at least one encryption processor processes a third set of data, and wherein the at least one encryption processor, the first authentication processor and the second authentication processor are coupled to the local data bus independent of each other and independent of the control unit.

2. A packet processor as recited in claim 1, wherein said data input of the control unit is coupled to a processor bus, and wherein each of said encryption and authentication processors comprises a data input coupled to the processor bus.

3. A packet processor as recited in claim 1, wherein said data input of the control unit is coupled to a processor bus and each of said encryption and authentication processors comprises a data input to the processor bus and means for reading and writing data on the processor bus.

4. A packet processor as recited in claim 1, wherein said second data bus comprises a daisy-chain connection between the encryption and authentication processors.

5. A packet processor as recited in claim 1, wherein the at least one encryption processor, the first authentication processor and the second authentication processor are configured to control the local data bus independently of the control unit.

6. A packet processor as recited in claim 1, wherein only the encryption processor is active.

7. A packet processor as recited in claim 1, wherein only the encryption processor and the first authentication processor are active.

8. A method of processing data packets comprising:
coupling a control unit to a first data bus;
receiving first and second data packets in the control unit from the first data bus;
coupling a plurality of processors to a second data bus independent of each other and independent of the control unit;
providing the plurality of processors in data communication with the control unit over the second data bus, independent of the first data bus, said processors including at least one encryption processor and at least one authentication processor;
providing data of the first data packet from the control unit to said at least one encryption processor, over the second data bus the at least one encryption processor encrypting and decrypting the first data packet;
processing said data from the first data packet with said at least one encryption processor to provide output data for the first data packet from said at least one encryption processor;
communicating said output data for the first data packet from said at least one encryption processor to said at least one authentication processor for further processing; and
providing data from the second data packet to said at least one encryption processor and processing the data from the second data packet in the at least one encryption processor while said at least one authentication processor further processes the output data for the first data packet.

9. A method as recited in claim 8, wherein said step of communicating the output data comprises communicating said output data over a daisy-chain connection between said processors.

10. A method as recited in claim 8, wherein said at least one authentication processor performs an integrity check of said output data.

11. A method of processing data packets comprising:
coupling a control unit to a first data bus;
receiving first and second data packets in the control unit from the first data bus;
coupling a plurality of processors to a second data bus independent of each other and independent of the control unit;
providing the plurality of processors in data communication with the control unit over the second data bus, independent of the first data bus, said processors including at least one encryption processor and at least one authentication processor;
providing data of the first data packet from the control unit to said at least one encryption processor, over the second data bus;
processing said data from the first data packet with said at least one encryption processor to provide output data for the first data packet from said at least one encryption processor;
communicating said output data for the first data packet from said at least one encryption processor to said at least one authentication processor for further processing; and
providing data from the second data packet to said at least one encryption processor and processing the data from the second data packet in the at least one encryption processor while said at least one authentication processor further processes the output data for the first data packet;
wherein said at least one authentication processor comprises a first and second authentication processors.

12. A method of processing data in a computer, the method comprising the steps of:
coupling an encryption processor and at least one authentication processor to a data bus independent of each other;
performing encryption on a first data packet within the encryption processor; and after completion of the encryption of the first data packet,
performing authentication of the first data packet within the at least one authentication processor connected to the encryption processor by the data bus, and
performing encryption of a second data packet within the encryption processor prior to completion of authentication of the first data packet.

13. The method of claim 12, wherein the authentication is a first authentication, further comprising the step of performing a second authentication on the first data packet of data.

14. The method of claim 13, wherein the first authentication is performed on the encrypted first data packet.

15. The method of claim 13, wherein the first authentication appends data to the encrypted first data packet.

16. The method of claim 13, further comprising the step of performing the encryption of the second data packet after beginning the second authentication of the first data packet.

17. A method of processing data in a computer, the method comprising the steps of:
coupling an encryption processor and at least one authentication processor to a data bus independent of each other;
performing encryption on a first data packet within the encryption processor;

and after completion of the encryption of the first data packet, performing authentication of the first data packet within the at least one authentication processor connected to the encryption processor by the data bus, and performing encryption of a second data packet within the encryption processor prior to completion of authentication of the first data packet;

wherein the authentication is a first authentication, further comprising the step of performing a second authentication on the first data packet of data;

wherein the first authentication appends data to the encrypted first data packet; and wherein the second authentication is performed on the encrypted first data packet and the appended data.

18. A method of processing data, the method comprising the steps of:

coupling an encryption processing module and a first authentication processing module to a data bus independent of each other;

encrypting a first data packet with the encryption processing module;

authenticating the encrypted first data packet with the first authentication processing module;

encrypting a second data packet with the encryption processing module while authenticating the first data packet with the first authentication processing module connected to the encryption processing module by the data bus; and authenticating the second data packet with the first authentication processing module.

19. An apparatus for processing data, comprising:

a computer having a data storage device connected thereto, wherein the data storage device stores data;

one or more computer programs, performed by the computer, for performing encryption on a first data packet within an encryption processor, and, after completion of the encryption of the first data packet, performing authentication of the first data packet in at least one authentication processor connected to the encryption processor by a data bus, and performing encryption of a second data packet within the encryption processor prior to completion of authentication of the first data packet, wherein the encryption processor and the at least one authentication processor are coupled to the local data bus independent of each other.

20. The apparatus of claim 19, wherein the authentication is a first authentication, further comprising means for performing a second authentication on the first data packet of data.

21. The apparatus of claim 20, wherein the first authentication is performed on the encrypted first data packet.

22. The apparatus of claim 20, wherein the first authentication appends data to the encrypted first data packet.

23. The apparatus of claim 20, further comprising the means for performing the encryption of the second data packet after beginning the second authentication of the first data packet.

24. An apparatus for processing data, comprising:

a computer having a data storage device connected thereto, wherein the data storage device stores data;

one or more computer programs, performed by the computer, for performing encryption on a first data packet within an encryption processor, and, after completion of the encryption of the first data packet, performing authentication of the first data packet in at least one authentication processor connected to the encryption processor by a data bus, and performing encryption of a second data packet within the encryption processor prior to completion of authentication of the first data packet, wherein the encryption processor and the at least one authentication processor are coupled to the local data bus independent of each other;

wherein the authentication is a first authentication, further comprising means for performing a second authentication on the first data packet of data;

wherein the first authentication appends data to the encrypted first data packet; and wherein the second authentication is performed on the encrypted first data packet and the appended data.

25. An article of manufacture comprising a computer program carrier readable by a computer and embodying one or more instructions executable by the computer to perform method steps for processing data, the method comprising the steps of:

performing encryption on a first data packet with an encryption processor; and after completion of the encryption of the first data packet,
performing authentication of the first data packet in at least one authentication processor connected to the encryption processor by a data bus, and performing encryption of a second data packet within the encryption processor prior to completion of authentication of the first data packet, wherein the encryption processor and the at least one authentication processor are coupled to the data bus independent of each other.

26. The article of manufacture of claim 25, wherein the authentication is a first authentication, further comprising the step of performing a second authentication on the first data packet of data.

27. The article of manufacture of claim 26, wherein the first authentication is performed on the encrypted first data packet.

28. The article of manufacture of claim 26, wherein the first authentication appends data to the encrypted first data packet.

29. The article of manufacture of claim 26, further comprising the step of performing the encryption of the second data packet after beginning the second authentication of the first data packet.

30. An article of manufacture comprising a computer program carrier readable by a computer and embodying one or more instructions executable by the computer to perform method steps for processing data, the method comprising the steps of:

performing encryption on a first data packet with an encryption processor; and after completion of the encryption of the first data packet,
performing authentication of the first data packet in at least one authentication processor connected to the encryption processor by a data bus, and performing encryption of a second data packet within the encryption processor prior to completion of authentication of the first data packet;

wherein the encryption processor and the at least one authentication processor are coupled to the data bus independent of each other;

wherein the authentication is a first authentication, further comprising the step of performing a second authentication on the first data packet of data;

wherein the first authentication appends data to the encrypted first data packet; and wherein the second authentication is performed on the encrypted first data packet and the appended data.

31. An article of manufacture comprising a computer program carrier readable by a computer and embodying one or more instructions executable by the computer to perform method steps for processing data, the method comprising the steps of:

encrypting a first data packet with an encryption processor;

authenticating the encrypted first data packet with a first authentication processor connected to the encryption processor by a data bus;

encrypting a second data packet with the encryption processor while authenticating the first data packet with the first authentication processor; and authenticating the second data packet with the first authentication processor, wherein the encryption processor and the first authentication processor are coupled to the data bus independent of each other.

32. A method of processing data packets comprising:

coupling a control unit to a first data bus;

coupling a plurality of processors to a second data bus independent of each other and independent of the control unit;

receiving a first data packet in the control unit from the first data bus;

providing the plurality of processors in data communication with the control unit over the second data bus, independent of the first data bus, said processors including at least one encryption processor and at least one authentication processor;

providing data of the first data packet from the control unit to multiple processors, over the second data bus;

processing said data from the first data packet with said multiple processors in parallel.

33. A method as recited in claim 32, wherein said plurality of processors comprises at least one encryption processor and a plurality of authentication processors.

34. A method of processing data packets comprising:

coupling a control unit to a first data bus;

receiving first and second data packets in the control unit from the first data bus;

coupling a plurality of processors to a second data bus independent of each other and independent of the control unit;

providing the plurality of processors in data communication with the control unit over the second data bus, independent of the first data bus, said processors including at least one encryption processor and at least one authentication processor;

providing data of the first data packet from the control unit to said at least one encryption processor, over the second data bus;

processing said data from the first data packet with said at least one encryption processor to provide output data for the first data packet from said at least one encryption processor;

communicating said output data for the first data packet from said at least one encryption processor to said at least one authentication processor for further processing; and providing data from the second data packet to said at least one encryption processor and processing the data from the second data packet in the at least one encryption processor while said at least one authentication processor further processes the output data for the first data packet;

wherein said at least one authentication processor performs an integrity check of said output data; and wherein said at least one authentication processor comprises an HMAC core.

35. A method of processing data packets comprising:

coupling a control unit to a first data bus;

receiving first and second data packets in the control unit from the first data bus;

coupling a plurality of processors to a second data bus independent of each other and independent of the control unit;

providing the plurality of processors in data communication with the control unit over the second data bus, independent of the first data bus, said processors including at least one encryption processor and at least one authentication processor;

providing data of the first data packet from the control unit to said at least one encryption processor, over the second data bus;

processing said data from the first data packet with said at least one encryption processor to provide output data for the first data packet from said at least one encryption processor;

communicating said output data for the first data packet from said at least one encryption processor to said at least one authentication processor for further processing; and providing data from the second data packet to said at least one encryption processor and processing the data from the second data packet in the at least one encryption processor while said at least one authentication processor further processes the output data for the first data packet;

wherein said at least one authentication processor performs an integrity check of said output data; and wherein said integrity check is performed using HMAC-key hashing.

36. A method of processing data packets comprising:

coupling a control unit to a first data bus;

receiving first and second data packets in the control unit from the first data bus;

providing a plurality of processors in data communication with the control unit over a first local data bus, independent of the first data bus, the plurality of processors being coupled to the first local data bus independent of each other and independent of the control unit, said processors including at least one encryption processor and at least one authentication processor, the at least one authentication processor being coupled to the at least one encryption processor by a second local data bus separate from the first data bus and the first local data bus;

providing data of the first data packet from the control unit to said at least one encryption processor, over the first local data bus;

processing said data from the first data packet with said at least one encryption processor to provide output data for the first data packet from said at least one encryption processor;

communicating said output data for the first data packet from said at least one encryption processor to said at least one authentication processor via the second local data bus for further processing; and providing data from the second data packet to said at least one encryption processor for processing by the at least one encryption processor, while said at least one authentication processor further processes the output data for the first data packet.

37. A packet processor apparatus for connection to a computer through a processor bus, the packet processor system comprising:

a controller having means for connection to the processor bus for communicating data of data packets to or from the processor bus;

a plurality of hardware processor devices, each capable of processing data simultaneous with the processing of data by at least one other of said hardware processor devices;

a local bus connecting the controller to the plurality of processor devices for communication of instructions from the controller to each hardware processor, wherein said instructions include instructions for processing data from a first data packet in a first one of the plurality of hardware processor devices and processing output from the first hardware processor device with a second one of the hardware processor devices, while data from a second packet is processed by the first hardware processor device, wherein the plurality of hardware processor devices are coupled to the local bus independent of each other and independent of the controller.

38. A packet processor apparatus as recited in claim 37, wherein the plurality of processor hardware devices comprise at least one encryption processor and at least one authentication processor.

39. A packet processor apparatus as recited in claim 37, wherein the first hardware processor device comprises an encryption processor device and wherein the second hardware processor device comprises an authentication processor device.

40. A packet processor apparatus for connection to a computer that operates on data from data packets communicated over a processor bus, wherein cryptographic and authentication functions are performed on the data packets prior to or after operation on the packet data by the computer, the packet processor comprising:

a controller having means for connection to the processor bus for communicating data of data packets to or from the processor bus;

at least one encryption processor device;

at least one authentication processor device;

a local bus connecting the controller to the encryption processor device and the authentication processor devices for communication of control instructions; and wherein said controller is configured to provide control instructions for processing data from a first packet in the at least one encryption processor devices and processing output from the at least one encryption processor device with the at least one authentication processor device, while data from a second packet is processed by the at least one encryption processor device, and wherein the at least one encryption processor device and the at least one authentication processor device are coupled to the local bus independent of each other and independent of the controller.

\* \* \* \* \*